March 29, 1949. D. STRAWN 2,465,405
STALK CUTTING MACHINE
Filed Jan. 9, 1945 2 Sheets-Sheet 1

INVENTOR.
DILL STRAWN
BY Lester B. Clark
& Ray L. Smith
ATTORNEYS

March 29, 1949. D. STRAWN 2,465,405
STALK CUTTING MACHINE
Filed Jan. 9, 1945 2 Sheets-Sheet 2

INVENTOR.
DILL STRAWN
By Lester B. Clark
& Ray L. Smith
ATTORNEYS

Patented Mar. 29, 1949

2,465,405

UNITED STATES PATENT OFFICE 2,465,405

STALK CUTTING MACHINE

Dill Strawn, Lytton Springs, Tex.

Application January 9, 1945, Serial No. 572,022

1 Claim. (Cl. 56—26)

This invention relates to a stalk cutter, and more particularly to a device of this type for use with a tractor and which may be readily attached to and detached from the tractor.

An object of the invention is to provide a device that is simple and effective and one which is inexpensive to construct and maintain.

Another object is to provide a device of the class described that may be hoisted to an elevated position when desired.

Still another object is to provide a device in which the hoisting mechanism includes a loose connection so that independent supporting means for the cutter mechanism will maintain the axis of rotation of the cutters a predetermined distance above the ground.

Still another object is to provide a device which includes cleaner blades whereby the cutting blades are kept clean.

The foregoing are primary objects which, together with other and more specific objects, will be more fully apparent from the following description taken in connection with the accompanying drawings, in which:

Fig. 3 is an enlarged detail showing the connection between the driving yoke and the cutter frame.

Figure 1:
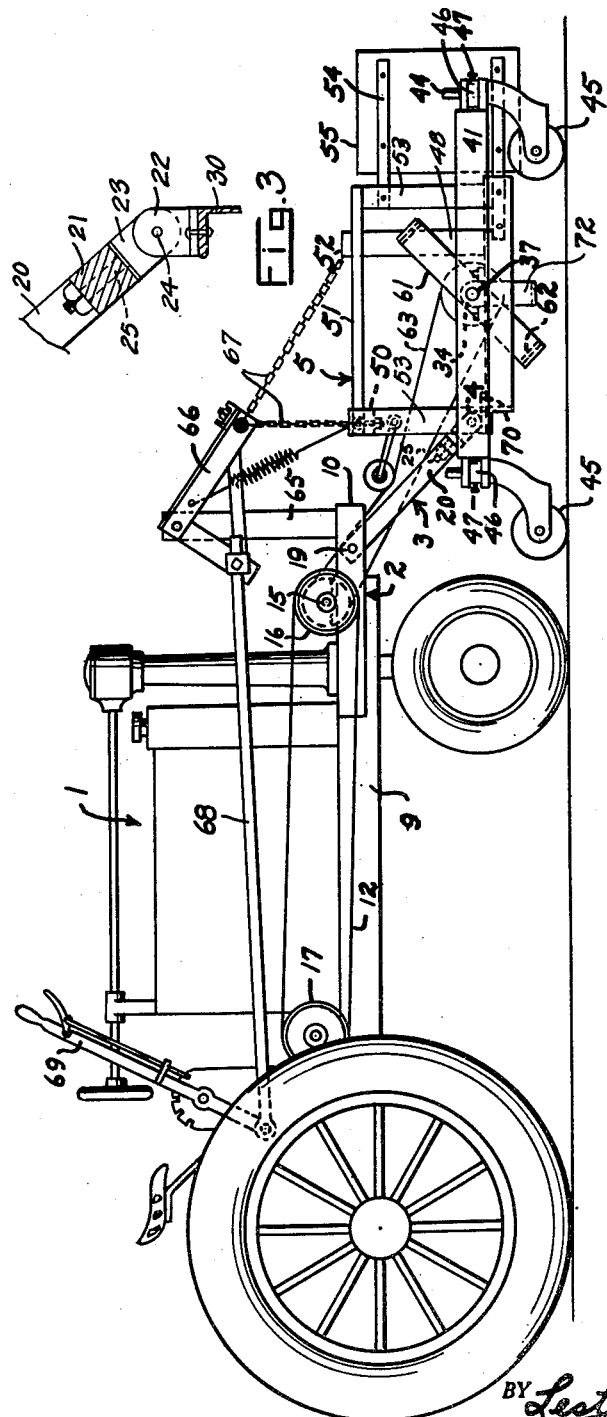
Fig. 1 is a side elevational view of an illustrated embodiment of the invention operatively attached to a tractor with which the device is used.

The invention as illustrated in the drawings is such that it may be readily attached to and driven by a conventional tractor 1 and comprises drive frame 2 attached to the tractor 1 and including a yoke 3 pivotally attached thereto and extending forwardly and downwardly for a swivel connection 4 to the cutter frame to which reference is generally made as 5.

The drive frame 2 includes spaced angle members 10 and 11 of such size and dimensions as to withstand stresses imposed in the normal and intended use of the device. These members are secured to the frame 9 of the tractor by any suitable fastening means such as bolts so that they extend forwardly from the tractor. Mounted on the members 10 and 11 are journal bearings 13 and 14 within which is mounted a countershaft 15 having a pulley 16 affixed to its outer end in alignment with the drive pulley 17 of the tractor 1. A second pulley 18 is also fixed to the countershaft 15 intermediate the bearings 13 and 14.

The yoke 3 is pivotally attached to the members 10 and 11 by means of bolts 19 and this yoke comprises arms 20 which are interconnected at their forward end by means of bar 21, through which bolt 25 passes to swivelly support ears 22, which receive lug 23 on the frame 5. A pin 24 interconnects the ears 22 and the lug 23 whereby a pivot connection is provided between the yoke 3 and the frame 5, so that the frame 5 is mounted to tilt in such manner as to permit the device to pass over uneven terrain as herein more fully described.

Figure 2:
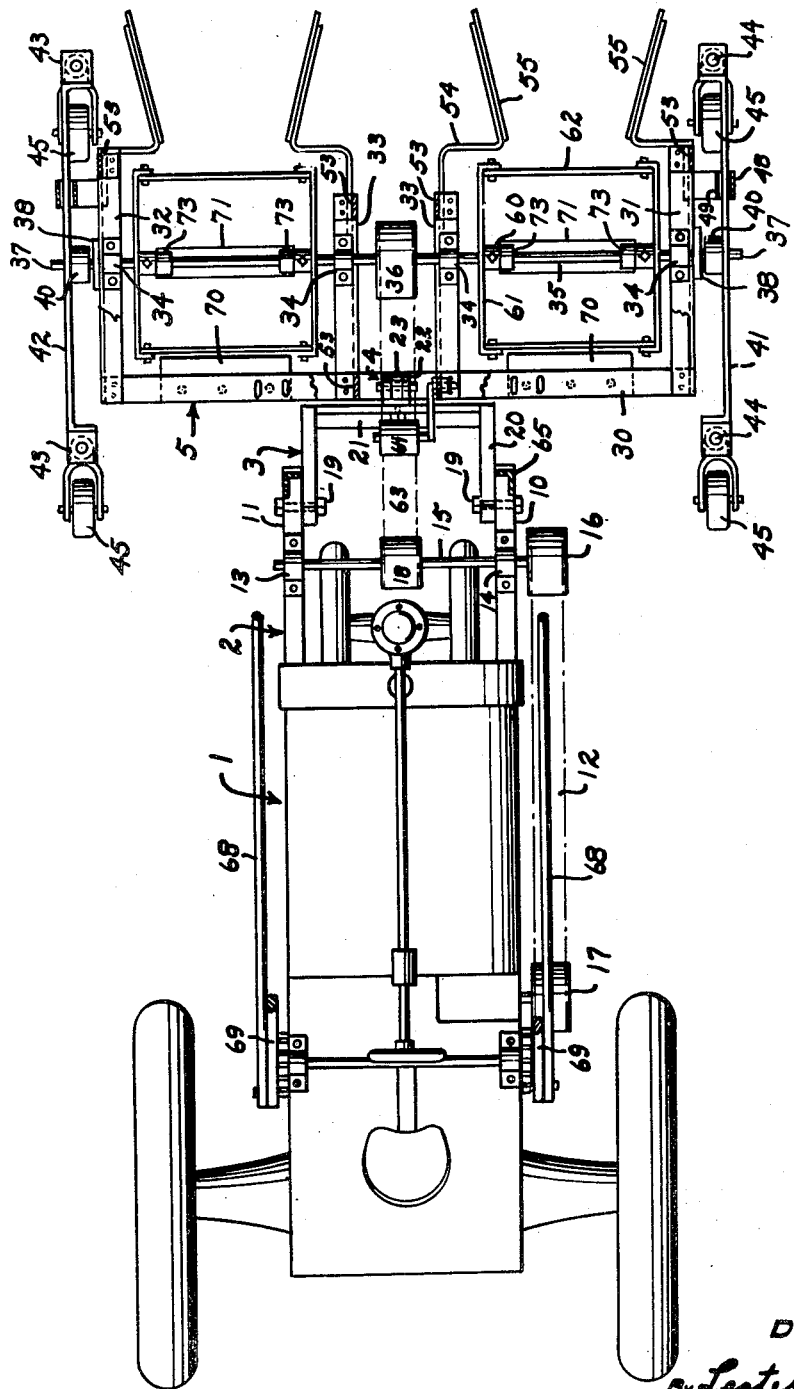
Fig. 2 is a plan view of the device shown in Fig. 1, certain portions being cut away for the purpose of more clearly illustrating the structure embodying the invention.

The frame 5 is a composite structure comprising a transverse beam 30 to which horizontal side members 31 and 32 and intermediate members 33 are attached. In plan, as shown in Fig. 2, this frame structure provides two generally rectangular sections which are open at their forward end to admit the entrance of stalks which are to be cut.

Aligned bearings 34 are mounted on the members 31, 32 and 33 and the cutter shaft 35 is rotatably mounted in these bearings, a pulley 36 being fixed upon this cutter shaft intermediate the members 33 and in alignment with the pulley 18 on the countershaft 15. Stud shafts 37 are flanged at 38 for attachment to the respective members 31 and 32 and these stud shafts pass through suitable bearings 40 in support beams 41 and 42. These beams have paired lugs 43 at their forward and aft ends with vertically aligned holes to receive the stem 44 of the respective caster type supporting wheels 45 upon which the cutting mechanism rides. These wheels 45 are adjustably held in position by means of collars 46 and associated set screws 47.

To rigidify the structure and permit limited vertical movement of the wheels 45 as the device passes over uneven terrain, vertical guides 48 and 49 are attached to the members 31 and 32 and extend outwardly and upwardly therefrom on opposite sides of the beams 41 and 42, and the upper ends of these guides are secured to an upper frame comprising transverse and longitudinal members 50, 51 and 52 supported upon pillars 53 which are in turn secured to the nether frame structure above described.

Secured to the forward pillars 53 are paired guide supports 54 upon which are mounted fenders 55. The device as shown is intended to be moved over two rows of stalks to be cut thereby and it is intended that the fenders 55 will engage the stalks and guide them into the cutter mechanism for each row.

The cutting mechanisms comprise spaced collars 60 attached to the cutter shaft 35, such collars being secured to cross arms 61 which extend in opposite directions from the shaft. The outer ends of the cross arms are interconnected by cutter blades 62 which extend in a direction generally parallel to the shaft 35. Power is delivered to this cutter mechanism by means of the belt 12 between pulleys 16 and 17 and the belt 63 between the pulleys 18 and 36. This latter belt is maintained taut by means of an idler pulley 64 mounted upon the frame 5.

Uprights 65 on the drive frame 2 are provided with bell crank levers 66, which are connected to the frame 5 through a loose connection such as the chains 67 similar to the lever and chain shown in U. S. Patent 1,312,281. The angular positions of the bell crank levers 66 upon their pivots are determined by the rods 68 and the hand levers 69 which are suitably located for manipulation by the operator, it being understood that this feature of the device may be operated by the conventional power lift, as is well known in the art.

It seems apparent that the construction just described enables lifting of the structure 5 to any desired elevation, as, for example, when the device is being transported from one place to another. On the other hand, when the device is to be used this mechanism may be operated to determine the lowermost position to which the cutter mechanism 5 may be lowered and at which time the wheels 45 will bear upon the surface upon which cutting is to be effected. If, however, the terrain over which the tractor and the device are to pass is uneven, the mechanism 5 is free to rise and fall in accordance with the terrain. Since the supporting beams 41 and 42 are pivotally mounted upon the stud shafts 37, there is such freedom of movement that the cutter blades are uniformly held at a predetermined height above the surface of the ground. Or, if the stalks to be cut are rank, the entire device may be lifted and supported at a desired elevation above the ground during operation. In any event, the stalks to be cut, whether green or dry, are effectively cut into short lengths.

In the event stalks engaged by the blade 62 are not severed, it is undesirable that these stalks be carried with the blades. To prevent this, there are provided cleaner blades 70 and 71 for each of the rotary cutters. The cleaner blades 70 are secured to the frame 5 in such position that they lie closely proximate the path of movement of the cutter blades 62. The cleaner blades 71 are, however, atached to weighted arms 72 which include collars 73 rotatable on shaft 35 so that these blades are retained under gravity in the position shown in the drawings.

The operation of the device of the invention is believed apparent from the foregoing description. By way of summary it will be assumed that the device is desirably attached to the tractor 1 and that the mechanism is held in elevated position by means of the levers 69 and associated elements during transportation. When the device is to be placed in operation the levers 69 are moved forward so that the wheels 45 will engage the surface upon which cutting is to be effected. Power is then applied from the drive pulley 17 to the cutter mechanism as the entire assembly is moved over the ground upon which stalks are to be cut.

The stalks are guided into the mechanism by the fenders 55 so that efficient cutting of the stalks is effected. If for any reason a stalk is not cut and is carried by the blade 62, such stalk will be displaced as the blade moves past the cleaning blade 70.

It is to be understood that the device may be rendered inoperative, when cutting is not desired, by disconnecting power from the pulley 17 by mechanism comprising a conventional and integral part of the tractor 1.

Broadly, the invention comprehends a stalk cutter adapted for attachment to a conventional tractor and one which is simple and efficient in operation for its intended purpose.

The invention claimed is:

In a tractor attachment for cutting stalks, a frame to be mounted upon a tractor, a rotary cutter mounted on an axis in said frame, means for driving said cutter, and cleaner blades mounted coaxial and proximate to said cutter to remove uncut stalks from the blades of the cutter, at least one of said cleaner blades including U-shaped support means therefor freely suspended from said cutter axis within the cutter and operable under gravity to remain stationary proximate the cutter elements.

DILL STRAWN.

REFERENCES CITED

The following references are of record in the file of this patent:

UNITED STATES PATENTS

| Number | Name | Date |
| --- | --- | --- |
| 1,043,507 | Coldwell | Nov. 5, 1912 |
| 1,551,543 | Coldwell | Sept. 1, 1925 |
| 2,152,158 | Slater | Mar. 28, 1939 |